United States Patent [19]

Chmiel et al.

[11] Patent Number: 5,576,044

[45] Date of Patent: Nov. 19, 1996

[54] COFFEE AROMA EMULSION FORMULATIONS

[75] Inventors: Oliver Chmiel, Marysville, Ohio; Helmut Traitler, Corseaux; Heribert Watzke, Lausanne, both of Switzerland; Scott A. Westfall, Marysville, Ohio

[73] Assignee: Nestec SA, Vevey, Switzerland

[21] Appl. No.: 382,326

[22] Filed: Feb. 1, 1995

[51] Int. Cl.⁶ ......................................................... A23F 5/46
[52] U.S. Cl. ........................... 426/594; 426/386; 426/591; 426/602; 426/651
[58] Field of Search ................................ 426/388, 386, 426/594, 602, 591, 651

[56] References Cited

U.S. PATENT DOCUMENTS

| | | | |
|---|---|---|---|
| 4,835,002 | 5/1989 | Wolf et al. | 426/590 |
| 4,871,564 | 10/1989 | Stoeckli et al. | 426/388 |
| 5,045,337 | 9/1991 | El-Nokaly et al. | 426/602 |

FOREIGN PATENT DOCUMENTS

0623287A1  4/1994  European Pat. Off..

OTHER PUBLICATIONS

Sivetz et al. 1979. Coffee Technology, AVI Publishing Co., Inc., Westport, Connecticut, p. 354.

*Primary Examiner*—Anthony J. Weier
*Attorney, Agent, or Firm*—Pennie & Edmonds

[57] ABSTRACT

An emulsion preconcentrate which contains hydrolyzed coffee oil and a coffee aroma. The emulsion preconcentrate is mixed with soluble coffee powder to provide a soluble coffee product. Upon dissolution of the soluble coffee product in hot water, the emulsion preconcentrate spontaneously forms an oil-in-water emulsion including droplets in the microemulsion range; the dispersed oil phase containing the aroma. This provides a burst of aroma.

17 Claims, No Drawings

COFFEE AROMA EMULSION FORMULATIONS

FIELD OF THE INVENTION

This invention relates to an emulsion preconcentrate which contains coffee aroma. The emulsion preconcentrate may be formulated with soluble coffee to enhance the coffee aroma given off by coffee made from the soluble coffee. The invention also relates to soluble coffee which is formulated with the emulsion preconcentrate.

BACKGROUND TO THE INVENTION

It is generally found in the coffee industry that consumers associate quality coffee with a good coffee aroma. If a coffee product lacks coffee aroma, consumer perception of the product is adversely affected. Unfortunately, soluble (or as it is commonly known, instant) coffee after drying is almost entirely aromaless. For this reason, it is conventional to trap coffee aromas which are given off during the processing of the soluble coffee and to later reincorporate these aromas into the soluble coffee.

The usual way of reincorporating the aroma is to first capture the aroma into a substrate such as an oil or emulsion. Suitable procedures for carrying out the capture of the aroma are disclosed in, for example, U.S. Pat. Nos. 3,823,241, 5,030,473, and 5,222,364 but many other techniques are known. Usually a coffee oil or an emulsion of coffee oil and coffee extract, is used as the substrate. The aroma-containing substrate is then usually sprayed on the soluble coffee powder prior to the coffee powders being filled into containers, which are then sealed. Unfortunately, with the substrates conventionally used, either the incorporation of the aroma into the substrate is too good (resulting in inadequate release of the aroma), or aesthetically unappealing oil slicks form on the coffee surface, or both. This has lead to the search for other ways of incorporating the aroma.

The formulation of coffee oil into microemulsions has been suggested; for example in U.S. Pat. No. 4,835,002. However the microemulsions described in this patent require the use of surfactants and alcohols in order for them to form. Unfortunately these sorts of ingredients should be kept to a minimum in foodstuffs and should not be present at all if the product is to be considered 100% coffee. Therefore these microemulsions are not suitable for use as coffee aromatizers. Further, there is no mention of the incorporation of coffee aroma into the microemulsion system; merely coffee oil.

Therefore there is still a need for a system for reincorporating coffee aroma into a soluble coffee product which provides a burst of aroma once the coffee product is dissolved in water, but which produces little or no oil slicks on the surface of the coffee.

SUMMARY OF THE INVENTION

In one aspect, this invention provides an emulsion preconcentrate comprising hydrolyzed coffee oil and coffee aroma, the emulsion preconcentrate spontaneously forming an oil-in-water emulsion including droplets of dispersed lipid medium of size less than 200 nm upon addition of water at a temperature higher than the melting point of the hydrolyzed coffee oil.

Surprisingly, coffee oil once hydrolyzed is able, at least partially, to spontaneously form an oil-in-water emulsion, upon the addition of hot water, which has characteristics of a microemulsion. A microemulsion is a thermodynamically stable, clear liquid which forms spontaneously upon addition of its components and which contains a lipid phase and an aqueous phase. The droplets of the dispersed phase have a droplet size less than 200 nm; and preferably less than 100 nm. Since a microemulsion is thermodynamically stable, the lipid medium does not form an oil slick on the surface of the aqueous medium. Hence the invention provides the substantial advantage of reducing the possibility of oil slicks forming on the surface of the coffee. Further, in a microemulsion, because the droplets of the dispersed phase are very small, the surface area of the dispersed phase, and hence the surface area for aroma release, is very large. Thus, upon dissolution in hot water, the preconcentrate provides a burst of coffee aroma above the cup; a very significant advantage.

Preferably the hydrolyzed coffee oil contains at least 10% by weight free fatty acids; and even more preferably at least 20% by weight free fatty acids. For example, the content of free fatty acids in the hydrolyzed oil may be in the range of about 50% to 90% by weight; preferably 70% to 85% by weight.

It is also preferred for the hydrolyzed oil to have a melting point above about 25° C.; for example about 30° to 40° C. With a melting point at these temperatures, the hydrolyzed oil is solid at room temperature leading to better entrapment of the aroma in the emulsion preconcentrate.

In another aspect, this invention provides a soluble coffee product comprising soluble coffee in particulate form and an emulsion preconcentrate as defined above.

Preferably, the emulsion preconcentrate comprises from 0.05% to 5% by weight of the soluble coffee product; more preferably 0.1 to 2% by weight. For example, the emulsion preconcentrate may comprises 0.2 to 0.6% by weight of the soluble coffee product.

Preferably the coffee aroma is entrapped directly in the hydrolyzed coffee oil. However it is also possible to entrap the coffee aroma in coffee oil and mix the coffee oil with the hydrolyzed coffee oil. In such a case, the mass ratio of hydrolyzed oil to unhydrolyzed coffee oil may fall within the range of 1:10 to 10:1; more preferably 1:5 to 5:1.

DETAILED DESCRIPTION OF THE INVENTION

Embodiments of the invention are now described, by way of example only. In this specification, an "emulsion preconcentrate" is a lipid medium which, when mixed with an aqueous phase at a temperature sufficiently high for the lipid medium to be liquid, is capable of self emulsifying to spontaneously form an oil-in-water emulsion which includes droplets of dispersed lipid medium in the microemulsion range. It is possible that amounts of the lipid medium may, for various reasons, form larger droplets than would fall within the definition of a microemulsion but these droplets are relatively stable; at least at neutral pH.

The emulsion preconcentrate is produced by first hydrolyzing a coffee oil. The coffee oil which is to be hydrolyzed may be produced by extracting it from spent coffee grounds and the like using procedures which are well known in the art. For example, the oil may be expelled from freshly roasted coffee beans using commercially available oil expellers. This technique and other suitable techniques for extracting coffee oil from coffee beans, are described in Sivetz, M, & Desrosier, N. W.; 1979; *Coffee Technology*, The AVI Publishing Company, Inc., pages 452 to 460; the disclosure of which is incorporated by reference. The source and the exact composition of the coffee oil used is not critical; primarily the oil will be selected for desired taste and oil stability characteristics.

The coffee oil may be hydrolyzed by any suitable hydrolysis procedure. For example, the coffee oil may be subjected to alkaline hydrolysis in a manner similar to conventional saponification processes for fats and oils. The alkaline used in the procedure may be any suitable alkaline but alkaline based upon alkali and alkali earth metal hydroxides are preferred (for example NaOH and KOH) since these metals occur naturally in coffee. Hence, if complete removal of the alkaline from the hydrolyzed coffee oil is not possible, the final product would still not have a composition different from coffee. The alkali metal hydroxide KOH is particularly preferred. The hydrolysis may be terminated in a conventional manner; for example by adding an acid. Again the acid used is best selected from acids which do not markedly affect the composition of the coffee product. For example, HCl may be used. This procedure gives particularly good results with high conversion of the coffee oil into free fatty acids; for example up to about 80%.

Alternatively, the coffee oil may be subjected to steam stripping at temperatures in the range of about 90° C. to about 210° C. Such a process may be carried out in a high pressure reactor using direct injection of steam at high pressure. This procedure has the advantage that trace elements are not added to the coffee oil during hydrolysis but the extent of hydrolysis may be lower; for example around 20 to 25%.

Another procedure for hydrolyzing the coffee oil is to react the coffee oil with between 5 to 20% by weight water in a sealed reactor. Reaction temperatures in the range of about 175° C. to 260° C. may be used. Reaction times of about 30 minutes to 2 hours are suitable. Particularly good results are obtained with about 10% by weight water reacted at 245° C. for 1 hour. Usually the hydrolysis is terminated by allowing the reaction mixture to cool. This procedure also has the advantage that trace elements are not added to the coffee oil. However, the procedure has the further advantage that high levels of free fatty acids are readily obtainable; for example up to 80%.

It will be appreciated that the hydrolyzed coffee oils produced by these processes are unlikely to be completely hydrolyzed in that amounts of mono-, di- and/or triglycerides will be present in the product hydrolyzed oil. If desired these glycerides may be removed by conventional separation techniques but this is not necessary. Therefore it is to be understood that in this specification, the term "hydrolyzed coffee oil" includes a coffee oil which has been partially hydrolyzed and thus contains amounts of mono-, di- and/or triglycerides; for example from about 5% to about 90% by weight mono-, di- and/or triglycerides. The hydrolyzed oils so produced usually have a melting point above about 30° C. and therefore they are solid at room temperature. This has the advantage of better entrapment of the aroma in the hydrolyzed oil; providing some improvement in aroma retention during storage.

Once the coffee oil has been hydrolyzed, the aroma must be incorporated into it. The aroma may be any suitable coffee aroma and many aromas are available. For example, the aroma may be in the form of a frost as produced by the process described in U.S. Pat. No. 5,182,926; the disclosure of which is incorporated by reference. However there are many other suitable techniques; for example the procedures disclosed in U.S. Pat. Nos. 3,823,241, 5,030,473, and 5,222, 364. The aroma may be incorporated into the hydrolyzed oil by warming the oil to just above its melting point and then mixing in the aroma; for example in a ribbon blender. Alternatively, the aroma may be captured in unhydrolyzed coffee oil, as is conventionally practiced in the art, and the unhydrolyzed oil then mixed with the hydrolyzed oil. As a further alternative, the aroma, in gas form, may be absorbed directly into the hydrolyzed oil in the same manner as the aroma is conventionally absorbed directly into unhydrolyzed oil. Suitable procedures for carrying this out are disclosed in, for example, U.S. Pat. Nos. 3,823,241, 5,030, 473, and 5,222,364.

Then the emulsion preconcentrate is mixed in with soluble coffee particles. If the emulsion preconcentrate is formulated with unhydrolyzed oil, the liquid mixture may be sprayed on the soluble coffee particles as is used in the art for unhydrolyzed coffee oil. Alternatively, the liquid mixture may be sprayed onto the walls of the containers in which the soluble coffee is to be packed. Techniques for spraying coffee oil onto soluble coffee and into containers are described in, for example, U.S. Pat. Nos. 3,769,032, 4,355, 571, 4,496,596 and 4,871,564 and European patent application 0 047 169. If the preconcentrate is not mixed with unhydrolyzed oil, it may be warmed until liquid and then sprayed on the soluble coffee in a similar manner. Alternatively the preconcentrate may be comminuted into small particles and mixed in with the soluble coffee particles. Further the comminuted preconcentrate may be blended with coffee liquor and sprayed on the soluble coffee.

The form of the soluble coffee used is not critical; it may be in the form of spray dried particles, freeze dried particles, aggregates, texturized particles, and the like.

In use, the user merely adds a teaspoon or two of the soluble coffee product per cup, as is conventional, to hot water. Once in the water, the emulsion preconcentrate spontaneously forms an oil-in-water emulsion including droplets of dispersed pahse having sizes below about 200 nm. These very fine droplets are stable but not visible to the eye. The aroma in these droplets is released due to the massive surface area of the dispersed phase and as the droplets constantly reform and the user perceives a burst of aroma above the cup. Since these droplets are not visible, they do not contribute to any unappealing oil slick on the surface of the coffee. Small amounts of oil may appear on the surface, particularly if the hydrolyzed oil contains high levels of glycerides or the soluble coffee product contained unhydrolyzed oil. However the amount of oil on the surface is well within acceptable ranges; for example equivalent to or less than that which would appear on the surface of roast and ground coffee.

To further illustrate the invention, the following examples are given:

EXAMPLE 1

Alkaline Hydrolysis of Coffee Oil

The following three coffee oils are used: Oil A which is the oil obtained by extracting coffee grounds with hexane and using the oil in an oil decaffeination process, Oil B which is obtained by pressing spent coffee grounds, and Oil C which is obtained by filtering Oil B. A 600 ml sample of each oil is placed in a reaction vessel in a water bath at 70° C. An aliquot of 200 ml of 2N KOH is added to each sample and the mixture incubated for 2 hours at 70° C. The reaction is stopped by adding 70 ml of 6N HCl.

Upon addition of the HCl, the mixture separates into an aqueous phase and an oil phase, the latter solidifying with cooling. Upon solidification of the oil phase, the aqueous phase is discarded leaving the hydrolyzed oils. The hydrolyzed oils are labelled A, B and C depending upon the initial oil used. The melting point of each hydrolyzed oil is determined to be in the range of 40 to 55° C.

A sample of 20 μg of each hydrolyzed oil is dissolved in 20 μl of a 2:1 chloroform:hexane mixture and then applied on a HPTLC plate (silica gel 60 F 254 obtained from Merck GmbH, Darmstadt, Germany) using capillaries. The plates are then subjected to HPTLC analysis using the two-stage development technique described in Jork et al; 1989; *Dünnschicht-Chromatographie*, Band 1a, Merck, VCH, Weinheim, Germany, pages 327 to 330. The composition of the neutral lipids is then determined by titration of gas chromatography. The composition for each sample is much the same and is generally as follows:

| Lipid | Content, mass % |
| --- | --- |
| Triglycerides | about 10 |
| Diglycerides | about 5 |
| Monoglycerides | 1 to 5 |
| Free fatty acids | 80 to 85 |

The composition of the free fatty acids for each sample is then determined by gas chromatography. The composition for each sample is much the same and is generally as follows:

| Fatty Acid | Approximate Content, mass % |
| --- | --- |
| C 14:0 | 0.1 |
| C 16:0 | 33.7 |
| C 18:0 | 7.5 |
| C 18:1 | 8.4 |
| C 18:2 | 43.5 |
| C 18:3 | 1.5 |
| C 20:0 | 2.9 |
| C 22:0 | 0.1 |

EXAMPLE 2

Droplet Sizes and Coffee Appearance

Four soluble coffee powder samples are prepared. Sample D includes 1% by mass of oil A, sample E includes 1% by mass of a mixture of hydrolyzed oil A and oil A (1:2 w/w ratio), sample F includes 1% by mass of a mixture of hydrolyzed oil B and oil A (1:2 w/w ratio), and sample G includes 1% by mass of a mixture of hydrolyzed oil C and oil A (1:2 w/w ratio). Boiling water is added to each sample and each sample is subjected to droplet size analysis using a submicron particle sizer (a Nicomb model 270 Submicron Particle Sizer obtained Pacific Scientific, Instrumental Division, of Silver Springs, Md., USA).

| | Sample D Mean size, nm | Samples E, F & G Mean size, nm |
| --- | --- | --- |
| Population 1 | — | 50 |
| Population 2 | 180 | 200 |
| Population 3 | 1000 | 750 |
| Mean | 920 | 680 |

Although each sample had two or three populations of droplets, the samples containing the hydrolyzed oil all contained populations of mean size of about 50 nm; indicating the presence of a microemulsion. The larger droplets in samples E, F & G are attributed primarily to the presence of the non-hydrolyzed oil in them. Also small amounts of larger droplets resulting from the hydrolyzed oils may occr.

Small amounts of very fine droplets of oil are detected on the surface of the coffee produced from samples E to G. The amount is well within acceptable ranges. The coffee produced from sample D has an oil layer on the surface including large droplets of oil. The coffee is not considered to be acceptable.

EXAMPLE 3

Aroma Perception

A coffee aroma frost is prepared using the procedure described in U.S. Pat. No. 5,182,926. The aroma frost is first incorporated into an amount of unhydrolyzed oil A by mixing the frost with the oil. This aromatized oil is then formulated into samples D' to G' as described in example 2. Boiling water is added to each sample. A sniffing panel is used to sniff each sample. The panelists perceive a burst of aroma above each coffee sample; the coffee from sample D' being perceived to be the most intense. This was put down to aroma loss due to the heating of the oils of samples E' to G' to the melting point of the hydrolyzed oils during mixing.

EXAMPLE 4

Aroma Perception

A sample of 320 g of hydrolyzed oil A from example 1 is aromatized with 283 g of coffee aroma frost by melting the oil and then mixing in the aroma frost. A sample of 320 g of non-hydrolyzed oil A from example 1 is aromatized with 343 g of coffee aroma frost as described in example 3. The samples are mixed with soluble coffee powder and hot water is added. A sniffing panel is used to sniff each sample. The panelists perceive an intense burst of aroma above each coffee sample with the sample containing the hydrolyzed oil giving a better brewed coffee aroma.

EXAMPLE 5

Steam Hydrolysis of Coffee Oil 500 g of coffee oil A of example 1 is loaded into a 1.5 litre high pressure bomb (Pressure Products Industries, Inc., Warminster, Pa., USA). Steam at 2070 kPa (300 psi) is directly injected into the pressure bomb to provide a reaction temperature of 204° C. (400° F). The contents are held at the reaction temperature for about 1 minute. Then the pressure is released and the hydrolyzed oil removed. The hydrolyzed oil has a melting point of about 40° C. and a free fatty acid content of about 25%.

The hydrolyzed oil is mixed with soluble coffee powder at about 1% by weight oil. Boiling water is added to the sample. Small amounts of fine droplets of oil are detected on the surface of the coffee. The amount is well within acceptable ranges.

EXAMPLE 6

Pressure and Temperatures Hydrolysis of Coffee Oil

Coffee oil A of example 1 is added to water to make up 90% by weight of the mixture. The mixture is degassed under vacuum and placed in a Parr bomb and the bomb heated to 246° C. for 60 minutes. The bomb is placed in an ice bath to terminate hydrolysis. The bomb is allowed to depressurize and is opened. Once the oil has solidified, the aqueous phase is discarded. The hydrolyzed oil has a melting point in the range of 30° to 40° C. and a free fatty acid content of about 80%.

The hydrolyzed oil is mixed with soluble coffee powder at about 1% by weight oil. Boiling water is added to the sample. Small amounts of very fine droplets of oil are detected on the surface of the coffee. The amount is well within acceptable ranges.

EXAMPLE 7

Pressure and Temperatures Hydrolysis of Coffee Oil

Coffee oil B of example 1 is added to water to make up 90% by weight of the mixture. The mixture is degassed under vacuum and placed in a Parr bomb and the bomb heated to 246° C. for 60 minutes. The bomb is placed in an ice bath to terminate hydrolysis. The bomb is allowed to depressurize and is opened. Once the oil has solidified, the aqueous phase is discarded. The hydrolyzed oil has a melting point in the range of 30° to 40° C. and a free fatty acid content of about 80%.

The hydrolyzed oil is mixed with soluble coffee powder at about 1% by weight oil. Boiling water is added to the sample. Small amounts of very fine droplets of oil are detected on the surface of the coffee. The amount is well within acceptable ranges. The sample is subjected to droplet size analysis as in example 2 and droplets of a mean size of about 50 nm are detected.

100 ml of water at pH 7 is held at a temperature of about 60° C. 20 mg of the hydrolyzed oil is added to the water. A slightly turbid emulsion spontaneously forms. The emulsion is subjected to droplet size analysis and the mean droplet size is determined to be about 290 nm; indicating the presence of droplets of size in the microemulsion range. The emulsion is inspected a week later and is found to be stable.

We claim:

1. A soluble coffee product comprising soluble coffee in particulate form and an emulsion preconcentrate comprising hydrolyzed coffee oil and coffee aroma, the emulsion preconcentrate at least partially forming an oil-in-water emulsion including droplets of dispersed lipid medium of less than 200 nm upon addition of water at a temperature higher than the melting point of, the hydrelyzed coffee oil.

2. A soluble coffee product according to claim 1 in which the hydrolyzed coffee oil contains at least 10% by weight free fatty acids.

3. A soluble coffee product according to claim 2 in which the hydrolyzed coffee oil contains from about 50% to 90% by weight free fatty acids.

4. A soluble coffee product according to claim 1 in which the hydrolyzed oil has a melting point of about 30° to 40° C.

5. A soluble coffee product according to claim 3 in which the hydrolyzed oil has a melting point of about 30° to 40° C.

6. A soluble coffee product comprising soluble coffee in particulate form and an emulsion preconcentrate, the emulsion preconcentrate comprising hydrolyzed coffee oil and coffee aroma, the microemulsion preconcentrate forming an oil-in-water emulsion including droplets of dispersed lipid medium of size less than 200 nm upon addition of water at a temperature higher than the melting point of the hydrolyzed coffee oil.

7. A soluble coffee product according to claim 6 in which the emulsion preconcentrate comprises from 0.05 % to 5% by weight of the soluble coffee product.

8. A soluble coffee product according to claim 7 in which the emulsion preconcentrate comprises from 0.1% to 2% by weight of the soluble coffee product.

9. A soluble coffee product according to claim 6 in which the emulsion preconcentrate further comprises unhydrolyzed coffee oil, the mass ratio of hydrolyzed oil to unhydrolyzed coffee oil being within the range of 1:10 to 10:1.

10. A soluble coffee product according to claim 9 in which the coffee aroma is absorbed in the unhydrolyzed coffee oil.

11. A soluble coffee product according to claim 6 in which the hydrolyzed coffee oil contains from about 50% to 90% by weight free fatty acids.

12. A soluble coffee product according to claim 6 in which the hydrolyzed oil has a melting point of about 30° to 40° C.

13. A soluble coffee product comprising soluble coffee in particulate form and from 0.05% to 5% by weight of a mixture of hydrolyzed coffee oil and coffee aroma, the hydrolyzed coffee oil containing from about 50% to 90% by weight free fatty acids and the soluble coffee product releasing the coffee aroma upon dissolution in hot water.

14. A soluble coffee product according to claim 5 in which the emulsion preconcentrate comprises 0.05 to 5% by weight of the soluble coffee product and the emulsion preconcentrate further comprises unhydrolyzed coffee oil, with the mass ratio of hydrolyzed oil to unhydrolyzed oil being in the range of 1:10 to 10:1.

15. A soluble coffee product according to claim 8 in which the emulsion preconcentrate further comprises unhydrolyzed coffee oil, with the mass ratio of hydrolyzed oil to unhydrolyzed oil being in the range of 1:10 to 10:1.

16. A soluble coffee product according to claim 13 in which the emulsion preconcentrate further comprises unhydrolyzed coffee oil, with the mass ratio of hydrolyzed oil to unhydrolyzed oil being in the range of 1:10 to 10:1.

17. A soluble coffee product according to claim 16 in which the free fatty acids are present in an amount of between about 75 and 85% by weight, the emulsion preconcentrate comprises 0.1 to 2% by weight of the soluble coffee product and the emulslon preconcentrate further comprises unhydrolyzed coffee oil, with the mass ratio of hydrolyzed oil to unhydrolyzed oil being in the range of 1:5 to 5:1.

* * * * *